Figure 1:
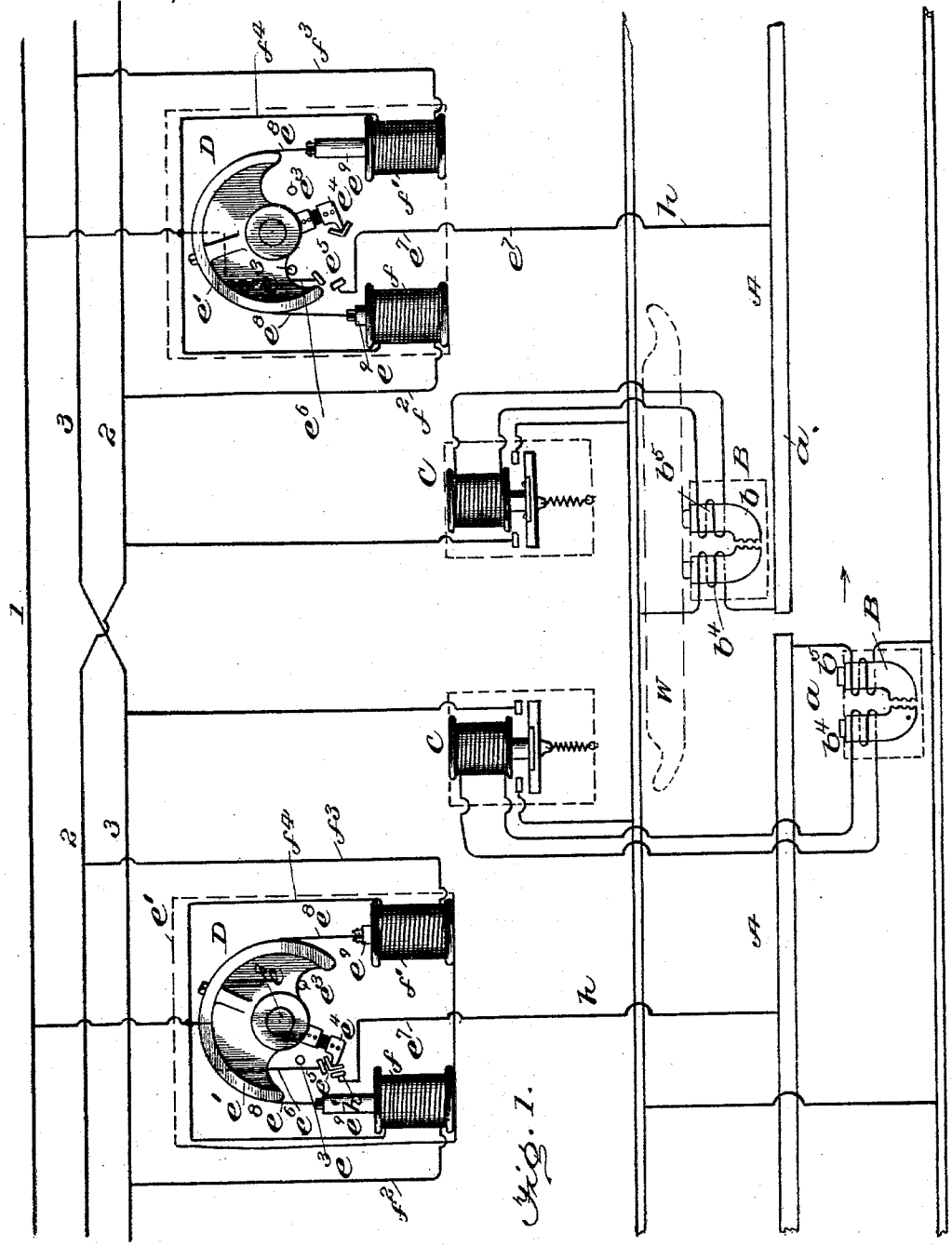

(No Model.) 7 Sheets—Sheet 1.

H. P. WELLMAN.
ELECTRIC RAILWAY SYSTEM.

No. 593,143. Patented Nov. 2, 1897.

Witnesses

Inventor
Harlan P. Wellman
by
Attorney

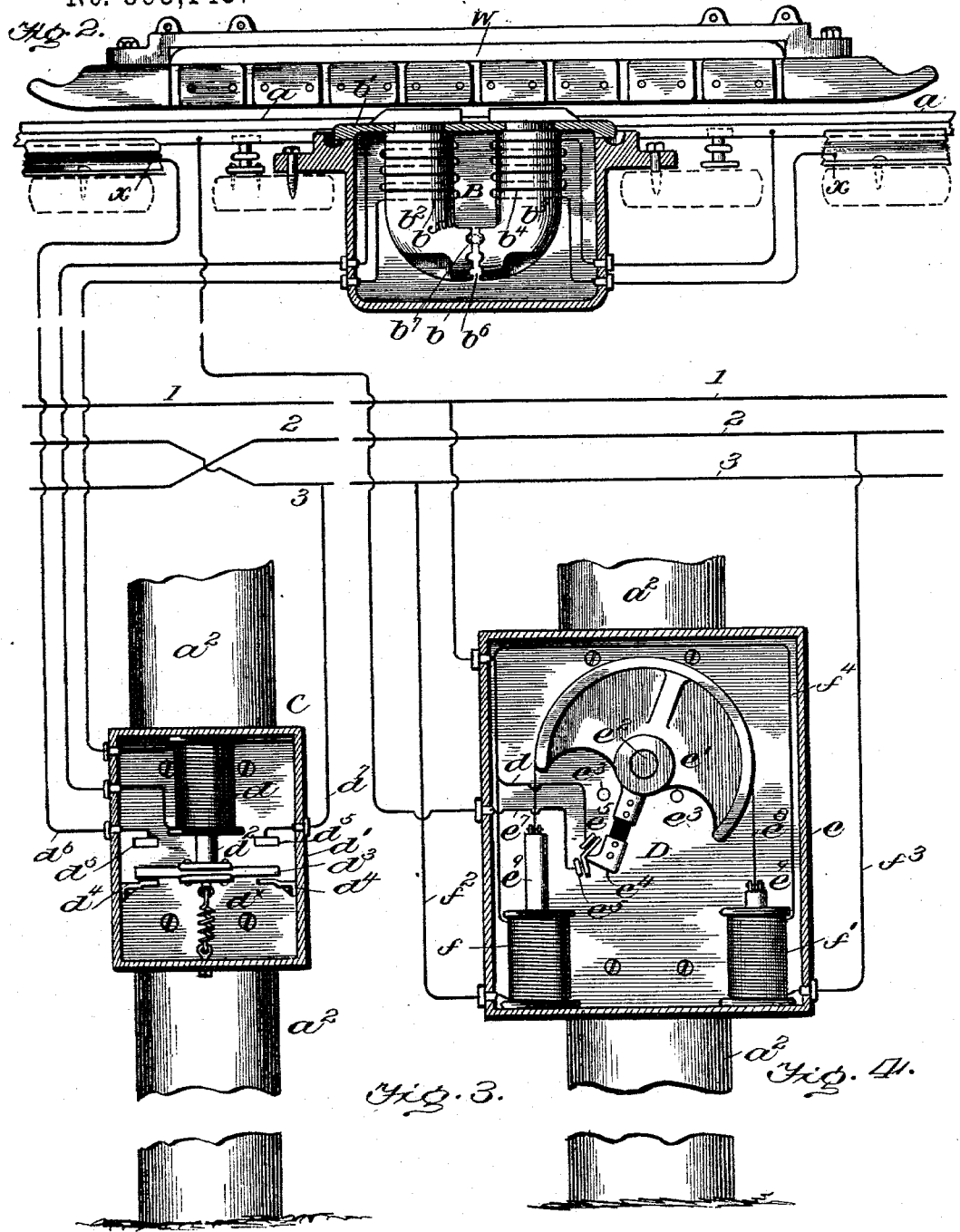

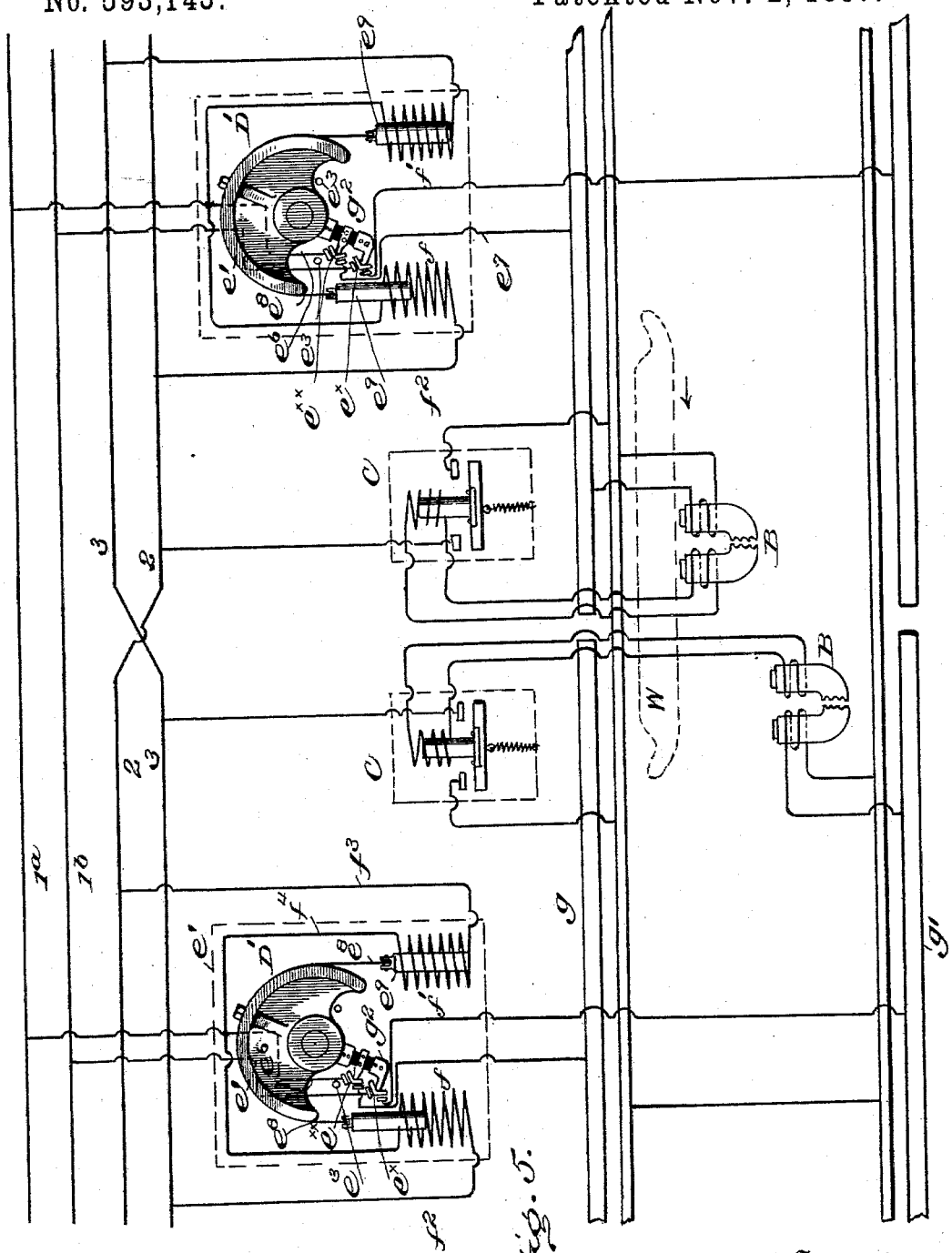

(No Model.) 7 Sheets—Sheet 4.

H. P. WELLMAN.
ELECTRIC RAILWAY SYSTEM.

No. 593,143. Patented Nov. 2, 1897.

Witnesses

Inventor
Harlan P. Wellman
by
Attorney (No Model.)  7 Sheets—Sheet 5.

H. P. WELLMAN.
ELECTRIC RAILWAY SYSTEM.

No. 593,143. Patented Nov. 2, 1897.

Witnesses

Inventor
Harlan P. Wellman
by
Attorney (No Model.) 7 Sheets—Sheet 6.
H. P. WELLMAN.
ELECTRIC RAILWAY SYSTEM.
No. 593,143. Patented Nov. 2, 1897.
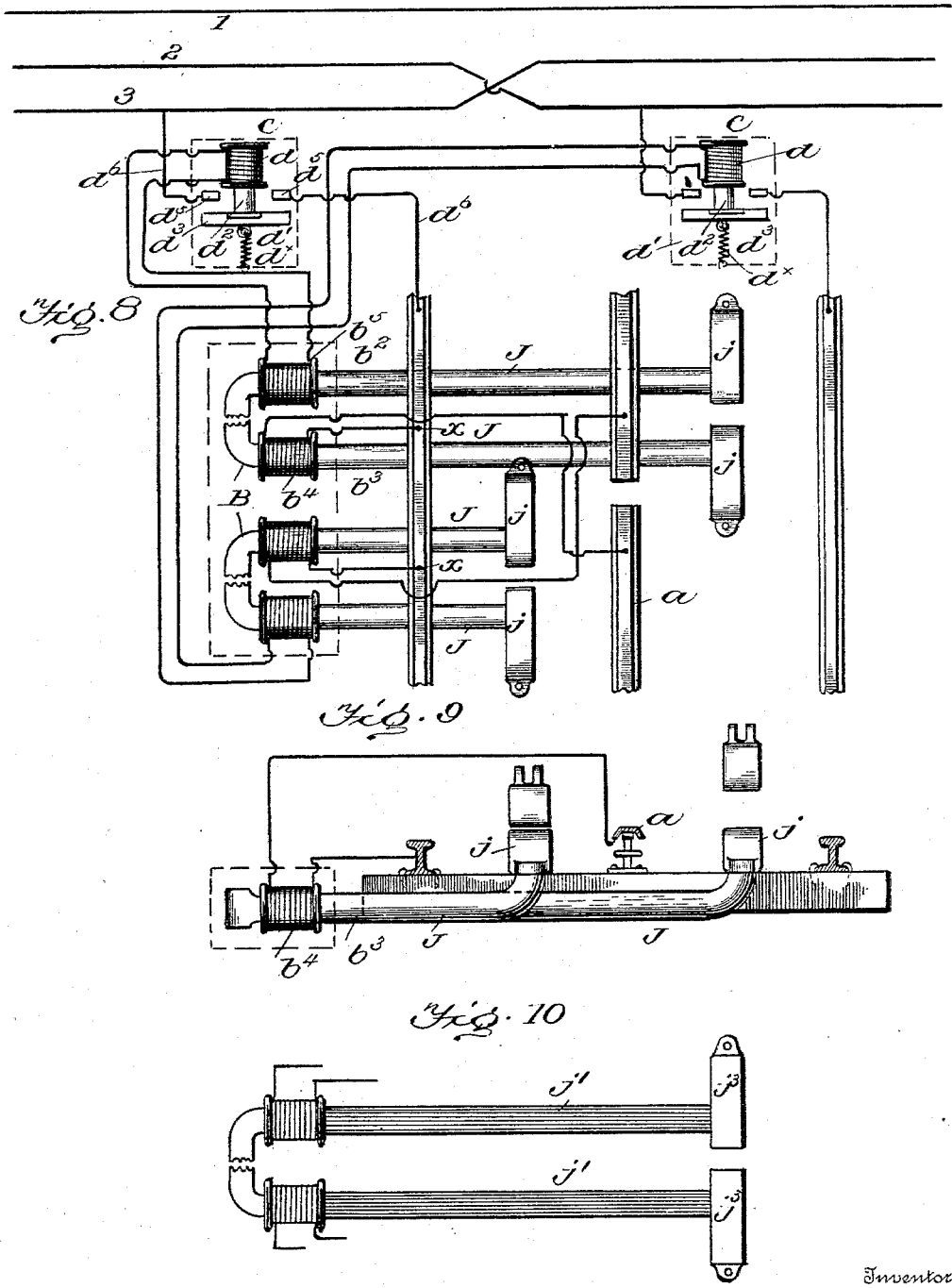
Witnesses
Jno Smire
Wm S. Hodges
Inventor
Harlan P. Wellman
by J. St. M. Hill.
Attorney (No Model.) 7 Sheets—Sheet 7.
H. P. WELLMAN.
ELECTRIC RAILWAY SYSTEM.
No. 593,143. Patented Nov. 2, 1897.

Witnesses

Inventor
Harlan P. Wellman
by
Attorney

UNITED STATES PATENT OFFICE.

HARLAN P. WELLMAN, OF ASHLAND, KENTUCKY.

ELECTRIC-RAILWAY SYSTEM.

SPECIFICATION forming part of Letters Patent No. 593,143, dated November 2, 1897.

Application filed May 26, 1897. Serial No. 638,304. (No model.)

*To all whom it may concern:*

Be it known that I, HARLAN P. WELLMAN, of Ashland, in the county of Boyd and State of Kentucky, have invented certain new and useful Improvements in Electric - Railway Systems; and I do hereby declare the following to be a full, clear, and exact description of the invention, such as will enable others skilled in the art to which it appertains to make and use the same.

This invention contemplates certain new and useful improvements in electric-railway systems.

The present invention relates to a system for conveying alternating electrical currents, single or multiphase, to a motor-car.

In an application for Letters Patent of the United States, Serial No. 608,379, filed October 8, 1896, and a subsequent application, Serial No. 615,484, filed December 12, 1896, I showed and described electric-railway systems embracing sectional conductors, sectional wires paralleling the track and conductors, and feed-in switches for cutting in and out the current to and from the sectional conductors. Both of said applications relate to systems using the direct current. By the present improvements I contemplate using the same line distribution as embraced by the inventions covered by said applications, but for the distribution of an alternating current feeding the same to a sectional conductor, from which it is conveyed to a motor-car.

In the present invention I employ an electrical transformer or converter having normally an interrupted or incompleted magnetic circuit, which is only temporarily completed by an inductor carried by the motor-car contacting with the ends of the cores of the transformer. On one core or limb of the latter is wound the primary coil, one end thereof being connected to the sectional conductor, by which it is initially partially charged, the other end being attached to one of the track-rails for track-return. In this primary coil the inducing-current traverses, while in the secondary coil on the other core or limb the current is generated by induction when the magnetic circuit is temporarily completed by the inductor. The secondary coil is connected, either direct or indirectly, through the agency of a circuit-closer, with suitable feed-in switches, which cut the current into and out of the sectional conductor. The intermediate circuit-closers are of the solenoid type, which operate an armature carrying a contacting-plate for closing the circuit.

The feed-in switch is on the principle of the gravity or balanced armature, such as shown and described in my before-mentioned applications for patents. It involves several points of improvements, including two solenoids the armatures of which control the circuit-closer, said solenoids being in circuit with the sectional wires.

The present invention also embraces means for controlling or regulating the extent of electrical communication between the two cores or limbs of the transformer, and also improved auxiliary means for cutting current into the conductor-sections from the sectional wires.

The invention will be hereinafter fully set forth, and particularly pointed out in the claims.

Figure 6:
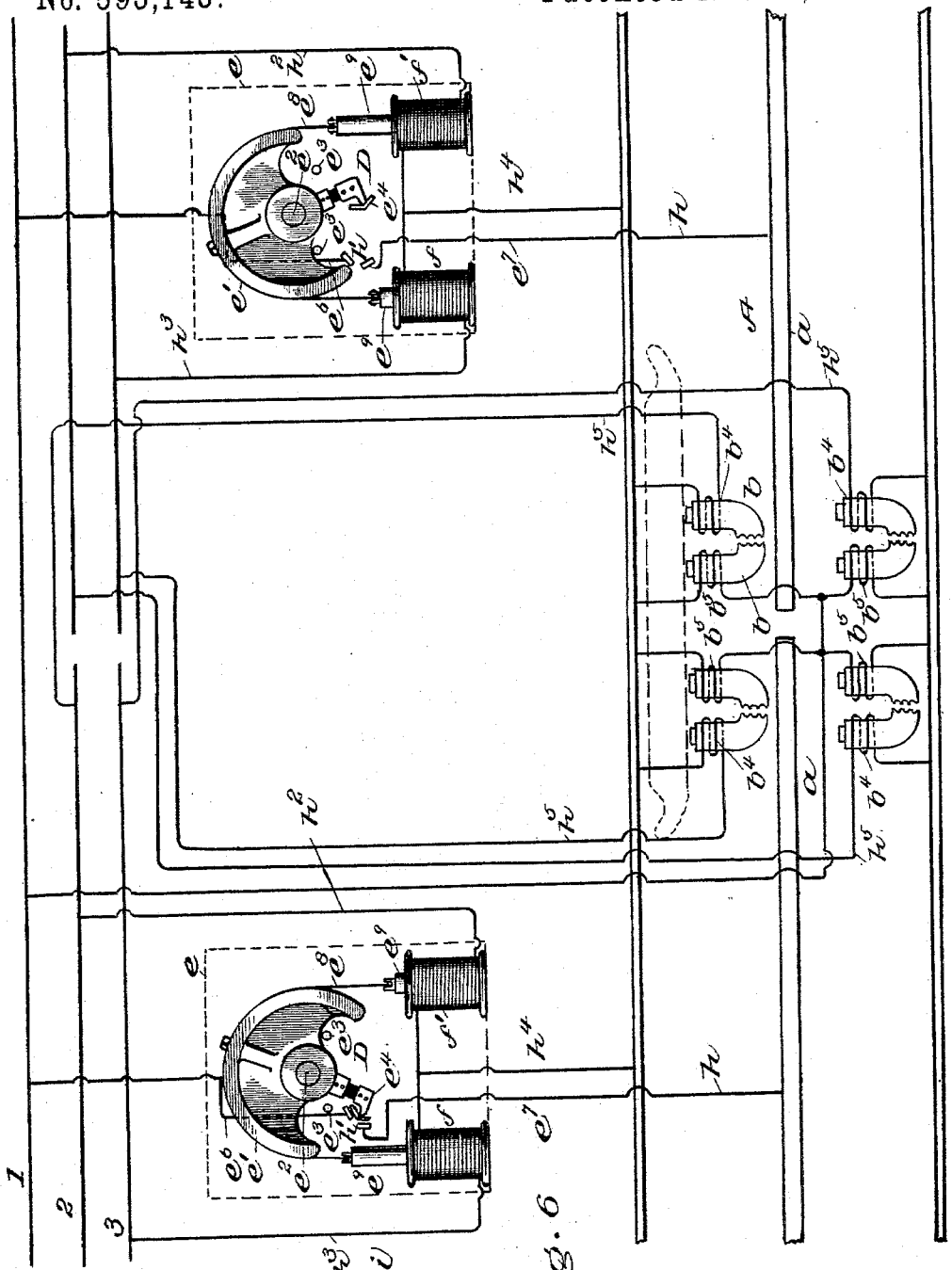
Figure 7:
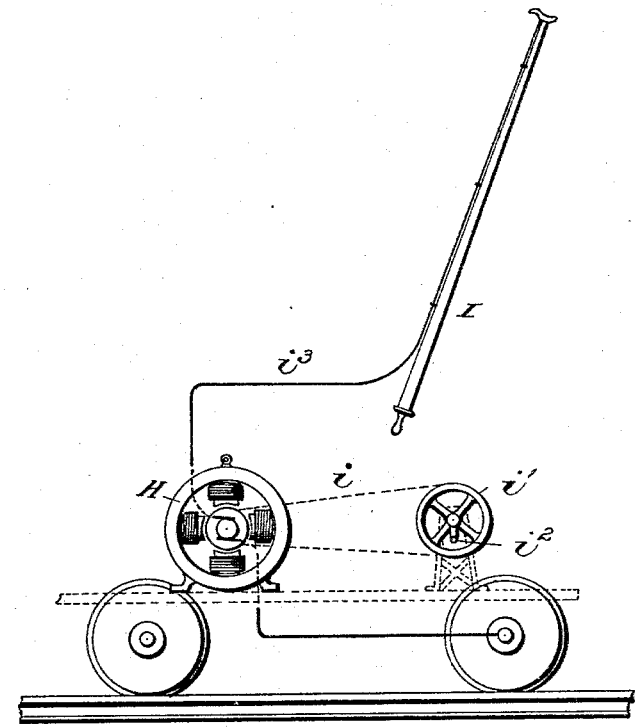
Figure 11:
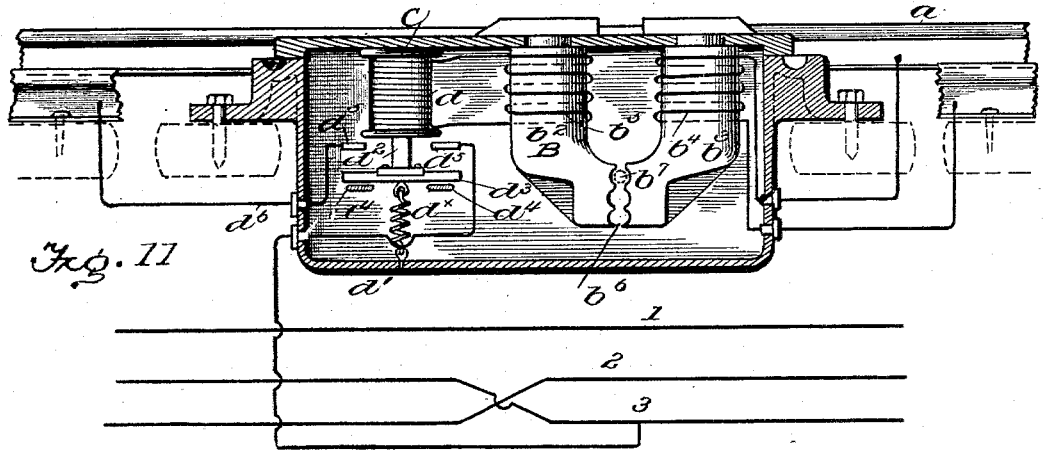

In the accompanying drawings, Figure 1 is a diagrammatical view showing the arrangement for single-phase current. Fig. 2 is an enlarged view of the transformer, its box being in section, the inductor being shown in engagement with the ends of the transformer cores or limbs. Fig. 3 is an enlarged view of the intermediate circuit-closer or short-circuiting switch, its box being in section. Fig. 4 is a similar view of the feed-in switch. Fig. 5 is a second diagrammatical view showing the multiphase circuit. Fig. 6 is a similar view in which the secondary coils of the transformer are shown in direct circuit with the feed-in switches. Fig. 7 shows the auxiliary device and its adjuncts for cutting current into the sectional conductor. Fig. 8 is a plan and diagrammatical view showing a slight modification of the transformers. Fig. 9 is an end or sectional view also showing the latter. Fig. 10 shows one way in which the cores or limbs of the converter may be made. Fig. 11 is an enlarged view showing a slightly-modified arrangement of transformer and circuit-closer. Figs. 12, 13, 14, 15, and 16 illustrate slight modifications in the transformer.

Referring to the drawings, A designates the sectional conductor, composed of a series of disconnected sections $a$ and $a'$, suitably mounted on insulated supports parallel with the track-rails.

1 is the main feeder-wire, strung on suitable poles $a^2$ (portions only of which are shown in Figs. 3 and 4) and paralleling the track-rails.

2 and 3 are the uninsulated sectional wires, likewise strung and corresponding to each conductor-section, said wires alternating in their relative arrangement at each section.

B is a transformer, C a short-circuiting switch, and D the feed-in switch, the two last named being preferably mounted on poles $a^2$, while the transformer is located in close juxtaposition to the track-rails.

The transformer or converter B is inclosed within a waterproof box $b$, fixed to the ties and having a non-magnetic cover $b'$. It is composed of two cores or limbs $b^2$ $b^3$, which are disconnected. Thus the magnetic circuit of the transformer is normally incomplete or interrupted. Upon the core $b^3$ is wound the primary coil $b^4$, and upon the core $b^2$ the secondary coil $b^5$. The upper ends of these cores are extended up through cover $b'$, and preferably elongated or provided with lengthened caps, with which a metallic inductor W, carried by the motor-car, is designed to have sliding contact. Two such inductors are carried by the motor-car, the one to the right, in either direction of travel, being used.

Figure 12:
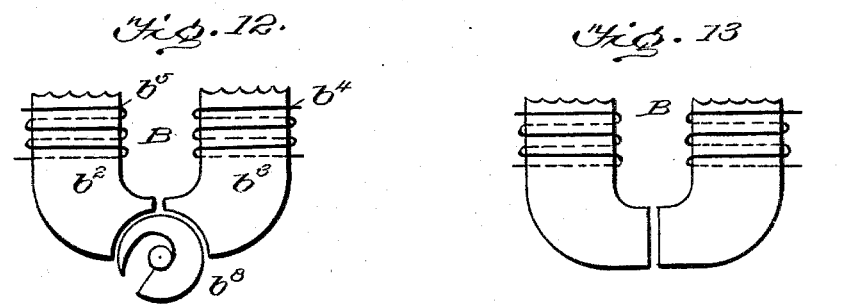
Figure 13:
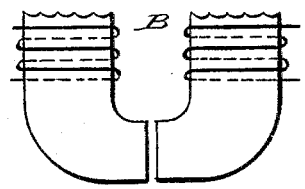
Figure 14:
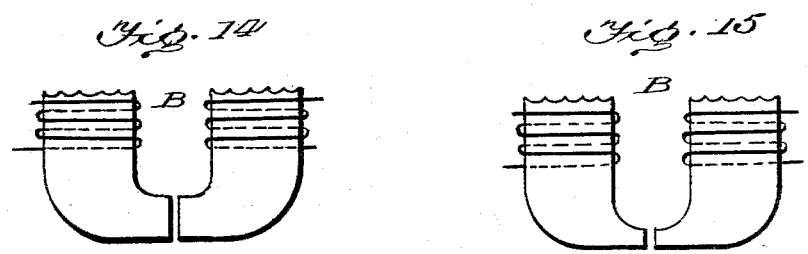
Figure 15:
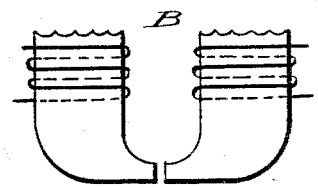
Figure 16:
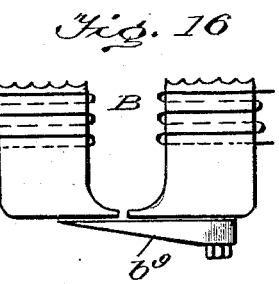

The transformer-magnetizing force is regulated at the lower ends of the two cores or limbs by the extent of the sectional area of the opposed surfaces. This may be done in various ways. In Fig. 2 I have shown these cores as having circular spaces between their lower ends formed by semicircular grooves $b^6$, in which one or more cylindrical plugs $b^7$ are designed to be placed. In Figs. 12 to 16 I have shown various ways in which this magnetizing force may be controlled. In Fig. 12 is shown a circular contact-wedge $b^8$, which upon being turned upon an axial center brings more or less of its sectional area into intimate contact with the ends of the two cores. In the forms shown in Figs. 13, 14, and 15 there is no actual contact between the core ends, but they are permanently very close to each other and the area of their opposed faces regulated by the proper number of magnetic lines of force to bridge or jump across from one core to the other. In this way more or less surface will be presented for the passage of the magnetic lines of force. In Fig. 16 I have shown a flat wedge-like plate $b^9$ attached to the end of one core. It can be temporarily or permanently extended across the core ends, and thus increase or diminish the sectional amount of contact between the core limbs.

The ends of the primary coil $b^4$ are connected, respectively, to one of the conductor-sections and the track-return $x$.

The primary coil is supplied with current only when the section of the conductor to which it is connected is alive with current. The magnetic circuit between the two cores being normally interrupted or incomplete, current is only generated in the secondary coil when proper contact is had with the exposed ends of the cores by the inductor W. Hence until the inductor is so in contact with the core ends the current in the primary coil has no effect on the secondary coil.

The ends or terminals of the secondary coil $b^5$ are connected direct to the solenoid magnetic coil $d$ of the short-circuiting switch C, inclosed within a waterproof box $d'$, located at a convenient point from the ground on one of the poles $a^2$. This coil is hollow or of tubular shape, and within it is designed to move a vertically-disposed armature $d^2$, which carries at its lower end a thoroughly-insulated circuit-closer $d^3$. This circuit-closer is normally held lowered against stops $d^4$ by a spring $d^\times$; but the instant the secondary coil $b^5$ is alive with current the solenoid $d$ will cause armature $d^2$ to move upwardly, elevating the circuit-closer $d^3$ into contact with terminals $d^5$ of wires $d^6$ and $d^7$, the former leading to the track-return $x$ and the latter to one of the uninsulated sectional wires, as 3, operating the next adjacent feed-in switches in circuit with said wire. Thus through the short-circuiting switch C the sectional wires are connected electrically with the ground or rail return, completing the circuit and operating the feed-in switches, one cutting the circuit into one of the sections of the conductor and the other simultaneously cutting it out of the next adjacent section, the latter having been traversed by the motor-car.

The feed-in switch D is also inclosed in a waterproof box $e$, secured to one of the poles $a^2$ at a suitable point. This switch comprises a rotary segmental disk $e'$, mounted on an arbor $e^2$, and having a preponderance of metal above the pivot-bearing, its movement in either direction being limited by stops $e^3$. This disk carries a lower circuit-closer $e^4$, which is designed to contact with and close the terminals $e^5$ of a wire $e^6$ $e^7$, leading from the feeder-wire 1 to the sectional conductor. Over the upper rounded surface of disk $e'$ extends a band $e^8$, of iron or steel, or it may be a sprocket-chain. It is made fast at its center to the said disk. To the lower ends of this band are connected iron or steel armature-cores $e^9$, which are movable perpendicularly in solenoids $f$ and $f'$. When one of these cores is lowered into its respective solenoid, the other core is held suspended at the upper end of the other solenoid. To one of the solenoids, as $f$, is connected a wire $f^2$, leading from sectional wire 3, while the other solenoid is in circuit with the other sectional wire, 2, by a wire $f^3$. The two solenoids are in circuit through a wire $f^4$. A short-circuiting switch, as C, in circuit with one of the sectional wires, as 2, being closed, current will circulate through solenoid $f'$, pulling down its armature-core $e^9$ and closing the terminals $e^5$ of the main feeder-wire, cutting current into the sectional conductor and closing circuit with track-return. As the motor-car passes off the section of the conductor just mentioned as being made alive with current the short-circuiting switch C, connected to the sectional wire 3, is closed, allowing the current to circulate through the coil of solenoid $f$, attracting its armature-core and rotating the armature-disk $e'$, opening the terminals $e^5$, thus cutting the current out of the sectional conductor with which the feed-in switch is in circuit.

As soon as the inductor contacts with the cores of the transformer the terminals $d^5$ are closed, permitting the electrical current to complete its circuit from one of the solenoids of the feed-in switch through the sectional wires 2 and 3, the said terminals $d^5$ of the short-circuiting switch, and thence to the ground or rail return. In this way the feed-in switch is operated for cutting the current in and out of the sectional conductor. Thus it will be seen that the alternating current being supplied to one of the conductor-sections and circulating through the primary coil of the transformer, with the inductor in proper sliding contact with the latter, a current is generated by induction in the secondary coil $b^5$, the latter operating the short-circuiting switch, which in turn operates the feed-in switch.

It will be understood that the sectional wires 2 and 3 are at all times alive with current, the same as main feeder-wire 1, from which the wires 2 and 3 are supplied with current after the same circulates through the solenoid-coils of the feed-in switch. As soon as any section is cut out of circuit the primary coil of the transformer previously charged therefrom is left dead, no current circulating therethrough. Owing to its self-induction the current loss of the transformer on open circuit is very small, so that when not operating the short-circuiting switch there is but little waste.

In Fig. 1 is shown the completed system for use of the alternating single-phase current arranged for a single feeder-wire 1 and one sectional conductor, which latter is represented as being located in the center of the track.

In Fig. 5 I have shown the completed system for use of the alternating multiphase current arranged for two sets or polarity of main feeder-wires $1^a$ and $1^b$, two sets of sectional conductors $g\ g'$, shown as located outside of the track-rails, and two sets of main feeder-terminals $e^\times\ e^{\times\times}$ in the feed-in switches D' for electrically connecting, respectively, feeder-wire $1^a$ with sectional conductor $g$ and feed-wire $1^b$ with conductor $g'$, the rails constituting the return. In this form the feed-in switch has its circuit-closer $g^2$ doubled, so to speak, so as to simultaneously close or open both terminals $e^\times$ and $e^{\times\times}$. In this way three circuits are provided between the generator and car-motor adapted to the two-phase, three-phase, and polyphase systems, generically called "multiphase" system.

In Fig. 6 the system is shown with the secondary coil of the transformer in direct circuit with the solenoid-coils of the feed-in switches through the medium of the sectional wires 2 and 3, which are not alive with current save when the feed-in switch is in operation. In this form no short-circuiting switch is employed. The current of the main feeder-wire 1 is not used for operating the feed-in switch. This wire is connected to the sectional conductor by a wire $h$, having terminals $h'$, designed to be closed by the feed-in switch. The solenoids of the latter are connected by wires $h^2\ h^3$ with sectional wires 2 and 3. One terminal of the secondary coil is grounded and one terminal of each of the solenoid coils of the feed-in switch is also grounded by a wire $h^4$, thereby completing the circuit from the transformer through the sectional wires 2 and 3, the solenoid-coils of the feed-in switch, the ground-wire $h^4$ to the rail-return, and direct again to the secondary coil $b^5$ of the transformer, thus completing the circuit. This figure also shows one terminal of the primary coil $b^4$ of the transformer connected direct to the sectional wires 2 and 3 through wires $h^5$ instead of direct to the sectional conductor, the other terminal being connected to the rail, as usual. In this system, using the secondary current of the transformer directly for operating the feed-in switch and normally with no current in the uninsulated sectional wires 2 and 3, special provision must be made for supplying current to a portable contact device when necessary to use the same to cut the current into a sectional conductor—for instance, when the inductor had failed to properly operate the transformer or from any cause the current had not been cut into the sectional conductor.

In Fig. 7 I have outlined a small dynamo-generator H, (of same potential and current capacity as the secondary coil of the transformer,) placed on the motor-car and connected by a belt $i$ to a wheel $i'$ on a crank-shaft $i^2$. As its use is infrequent it may be operated by manual power. The positive terminal of this dynamo is connected by a wire $i^3$ to a portable contact device I, while the other or negative terminal is connected to the ground-return. In using this device the coils of the feed-in switch and the secondary coils of the transformer are connected in multiple with each other to the ground-return each time the said device is applied to either of the wires 2 or 3, and consequently to insure the operation of the feed-in switch its solenoid-coils must be wound for a much lower resistance than the secondary coils of the transformer, thus allowing the current of the hand-operated dynamo, applied to the wires 2 3 by the device I, to circulate through the solenoid-coils of the feed-in switch and operate the latter, thereby cutting the current into the sectional conductor.

In Figs. 8 and 9 I have shown the transformer located outside of the track-rails and provided with elongated cores J, extended between the track-rails and terminating in caps $j$, for contact therewith of the inductors carried by the motor-car. While I do not restrict myself to any special form of constructing the cores or limbs of the transformer, yet in the form shown in Figs. 8 and 9 I preferably build up the elongated cores of laminated strips $j'$ of magnetic sheet metal, as shown in Fig. 10, or this structure may be made of iron or steel wires, thus producing better results than are attainable from cores of solid metal. In this form the contact-caps $j^3$ are cast around the laminated or wire parts of the cores.

In Fig. 11 I have shown the short-circuiting switch C inclosed in the box of the transformer B. In this form the terminals of the secondary coil $b^5$ are immediately connected direct to the solenoid of the switch, and the connecting-wires leading from the sectional wires 2 and 3 are brought directly to the transformer-casing and connected to the terminals of the short-circuiting switch.

While I have shown and described the preferred form of means for carrying out my present invention, I do not restrict myself thereto, since various changes may be made without departing from the scope of my invention.

In practice the exposed neutral or capped ends of the cores of the transformer are elongated, so that the inductors of the motor-car will have longer contact when passing over the transformer and in this way will hold the short-circuiting switch closed longer and effect better operating results. The inductor, quickly passing over the transformer contacting with it, completes its magnetic circuit, and generating, by electrical and magnetic induction, an alternating current the latter is conveyed to and traverses the solenoid-coils of the short-circuiting switch, which closes the terminals $e^5$ and grounds the sectional wires, which action allows the electrical current to traverse one of the coils of the two adjacent feed-in switches and instantly cuts the line-current in one sectional conductor and out of the other. The transformers are located in close relation to the terminals of the conductor-sections, so that as the motor-car is leaving one section the current will be simultaneously cut out therefrom and into the next forward section.

The transformer B and short-circuiting switch C, when inclosed in the same casing, (see Fig. 11,) may be used in a manner different from that described. Each section of conductor A may be made very short and each provided with a transformer B and switch C. The terminals of the primary coil of the transformer may be connected between and to the main-line feeder and rail-return, respectively, while the terminals of the secondary coil are connected directly to the solenoid-coil of switch C, and the main terminals $d^5$ of switch C are directly connected between the main feeder and a section of conductor A. Thus when the terminals $d^5$ are closed electric current circulates directly from the main feeder to the conductor A. In this form there would only be one inductor for each motor-car and it would always be in proper position for contacting with the exposed core ends of the transformer. The length of the inductor should be as great as the length of the car-body will admit without projecting past the ends thereof, and the conductor-sections $a$ should be of such length as will permit the inductor to be in engagement with the exposed core ends of two or more transformers at the same time.

The current-collector or trolley-shoe should be located under the car and in the exact center of the inductor and should be very short or have small sectional contact with the conductor, but should be long enough to bridge across the space between any two adjacent conductor-sections. In this manner whenever there is current in the feeder-wires current circulates through the primary coil of transformer B, and with inductor contacting with the exposed core ends of two or more adjacent transformers current is by induction generated in the secondary coil of same, and circulating through the solenoid-coil of switch C draws up the armature of the latter, closing the terminals $d^5$, thus conveying the main feeder-current direct to the conductor-section $a$ and enlivening with current the two or more adjacent sections of conductor A and at the time these are directly beneath the motor-car, and the currect-collector or trolley-shoe does not make contact with a section of the conductor until after it has been made alive with current. Thus it will be seen there can be no arcing of current on trolley-shoe when passing over different sections of the conductor, and the car-motor cannot be left on an interrupted or open circuit.

I claim as my invention—

1. An electric-railway system comprising a sectional conductor, a feed-in switch for each section for controlling the electric current thereto, a transformer or converter initially partially charged by the alternating current of one section of said conductor, and having its magnetic circuit normally incomplete or interrupted, and means for temporarily completing said magnetic circuit, whereby said transformer will operate the same feed-in switches, substantially as set forth.

2. An electric-railway system, comprising a sectional conductor, a feed-in switch for each section for controlling the electric current thereto, a transformer or converter having its magnetic circuit normally incomplete or interrupted, a primary coil thereof initially charged by an alternating current from one section of said conductor, a secondary coil in line of circuit with said feed-in switch, and means for completing the magnetic circuit of said transformer, thereby charging said secondary coil by induction, whereby the electric current will be cut into and out of said conductor, substantially as set forth.

3. An electric-railway system comprising a track, a sectional conductor, a feeder-wire, a feed-in switch in line of circuit between the latter and said conductor, and a transformer or converter having a normally incomplete magnetic circuit and a primary coil in circuit with said conductor and track, and a secondary coil in line of circuit with said feed-in switch and track, and means for temporarily completing the magnetic circuit of said transformer, whereby said feed-in switch will cut the current into and out of said conductor, substantially as set forth.

4. An electric-railway system comprising a track, a sectional conductor, a main feeder-wire, a feed-in switch in line of circuit between the latter and said conductor, connection between said feed-in switch and track, sectional wires, a transformer or converter having one coil in line of circuit with said feeder-wire, whereby it will be initially charged by an alternating current, a second coil in line of circuit with said feed-in switch, said transformer having a normally incomplete magnetic circuit, and an inductor, or the like, for temporarily completing said magnetic circuit, whereby said feed-in switch will be operated, substantially as set forth.

5. An electric-railway system comprising a sectional conductor, a feed-in switch for each section, a transformer or converter having a primary coil initially charged by one section of said conductor, a secondary coil, a short-circuiting switch in line of circuit between said secondary coil and said feed-in switch, and means for charging said transformer and closing said short-circuiting switch, substantially as set forth.

6. An electric-railway system comprising a sectional conductor, a main feeder-wire, a feed-in switch in line of circuit between the latter and said conductor, sectional wires in circuit with said feed-in switch, a transformer having a primary coil in circuit with said conductor and track-returns and designed to be initially charged by an alternating current, a secondary coil, a short-circuiting switch in line of circuit between said secondary coil and said sectional wires and feed-in switch, and forming, when closed, a ground connection for one of said sectional wires, substantially as set forth.

7. In an electric-railway system, a transformer or converter normally having an incomplete magnetic circuit, and means carried by a motor-car for temporarily completing said magnetic circuit, substantially as set forth.

8. In an electric-railway system, a transformer or converter normally having an incomplete magnetic circuit, and an inductor carried by a motor-car for engaging said transformer and temporarily completing said magnetic circuit, substantially as set forth.

9. In an electric-railway system, a transformer or converter normally having an incomplete magnetic circuit, a primary coil initially charged by an alternating current, a secondary coil, and means carried by a motor-car for contacting with said transformer and temporarily completing its magnetic circuit and charging said secondary coil by induction, substantially as set forth.

10. In an electric-railway system, a transformer having cores which are disconnected at their ends, the sectional area between two of the opposed ends of said cores being regulated to control the passage of the magnetic lines of force, and means carried by a motor-car for temporarily completing the magnetic circuit between said cores, substantially as set forth.

11. In an electric-railway system, a transformer having cores which are disconnected at their ends, means for regulating the sectional area between two of the opposite ends of said cores, and means carried by a motor-car for temporarily completing the magnetic circuit between said cores, substantially as set forth.

12. In an electric-railway system, a transformer having two cores, on which are wound primary and secondary coils, said cores being disconnected at their ends, and having means for increasing and diminishing the sectional area between two of the opposed ends of said cores, and an inductor, or the like, carried by a motor-car for temporarily completing the magnetic circuit between said cores by contacting with the other disconnected ends thereof, substantially as set forth.

13. In an electric-railway system, a transformer having two cores provided with opposite grooves in their opposed ends, plugs for fitting in said grooves, and an inductor, or the like, for contacting with the other ends of said cores, substantially as set forth.

14. In an electric-railway system, a main feeder-wire, a sectional conductor, a feed-in switch between the latter and said wire, sectional wires in circuit with said feed-in switch, a short-circuiting switch in line of circuit between said sectional wires and the ground-return, said switch comprising a solenoid, an armature movable therein, and a circuit-closer carried by said armature, whereby when said solenoid is charged the circuit between said feed-in switch and ground-return will be closed, substantially as set forth.

15. In an electric-railway system, a feed-in switch comprising a rotatable circuit-closer weighted above its pivot-bearing, two solenoids having armatures depending from said circuit-closer, whereby as either solenoid is charged said circuit-closer will be moved on its bearing, its weight serving to impel movement thereof, as set forth.

16. In an electric-railway system, a feed-in switch comprising a rotatable circuit-closer weighted above its pivot-bearing, two solenoids, vertically-disposed armatures movable therein, and a band, or the like passed over the upper portion of said circuit-closer, and to the ends of which said armatures are connected, substantially as set forth.

17. In an electric-railway system, a feed-in switch comprising a pivoted circuit-closer having an upper weighted curved portion concentric to its pivot-bearing, two solenoids, armatures movable therein, and a band, or the like, encircling said curved portion and having said armatures secured to its ends, said weighted portion of said closer being above its pivot-bearing, substantially as set forth.

18. In an electric-railway system having a conductor, a main feeder-wire, a wire leading from the latter to said conductor having contact-terminals, a feed-in switch comprising a circuit-closer pivotally mounted, and a contact end designed to engage said terminals, two solenoids, vertically-disposed armatures movable therein, and a connection between said armatures engaging said circuit-closer above its bearing, and means for charging said solenoids, whereby the electric current will be cut into and out of said conductor, substantially as set forth.

19. An electric-railway system comprising track-rails, sectional conductors, a main feeder-wire, uninsulated sectional wires paralleling said feeder-wire, a feed-in switch for each conductor-section having opposite solenoids connected to said sectional wires, whereby upon the current being grounded between any two adjacent feed-in switches, the current circulating in the opposite solenoids will, through said feed-in switches, cause the current to be cut into the sectional conductor in advance of, and out of the sectional conductor passed over by, the motor-car, a transformer, or the like, in line of circuit between said conductor and track with said feed-in switch, and having its magnetic circuit normally incomplete and an inductor, or the like, carried by the motor-car for temporarily completing said magnetic circuit, substantially as set forth.

20. In an electric-railway system having a sectional conductor, a main feeder-wire, a feed-in switch between the latter and said conductor, sectional wires paralleling said sectional conductor, a motor-car having a portable contact device comprising a rod or pole having a contact-terminal at one end designed to be engaged with one of said sectional wires, a dynamo on said motor-car to which said contact-terminal is connected, and a crank-shaft for operating said dynamo, substantially as set forth.

21. In an electric-railway system, a transformer or converter located to one side of the track-rails and having its cores elongated and extended between the track-rails, and caps on the ends thereof, and an inductor, or the like, carried by a motor-car, designed to engage said caps, substantially as set forth.

22. In an electric-railway system, a transformer or converter located to one side of the track-rails and having its cores elongated and extended between the track-rails, and caps on the ends thereof, and an inductor, or the like, carried by a motor-car, designed to engage said caps, said cores being made up of laminated plates or wires, substantially as set forth.

23. In an electric-railway system, a transformer having its magnetic circuit normally incomplete, the cores thereof being in line of passage of a car-inductor, a sectional conductor, feeder-wires, a short-circuiting switch, and a box or casing in close juxtaposition to the track inclosing said transformer and switch, substantially as set forth.

In testimony whereof I have signed this specification in the presence of two subscribing witnesses.

HARLAN P. WELLMAN.

Witnesses:
OSCAR HENTHORNE,
H. McCOWN.